SOLON L. CHEYNEY.
Improvement in Driers.
No. 120,242.
2 Sheets--Sheet 1.
Patented Oct. 24, 1871.
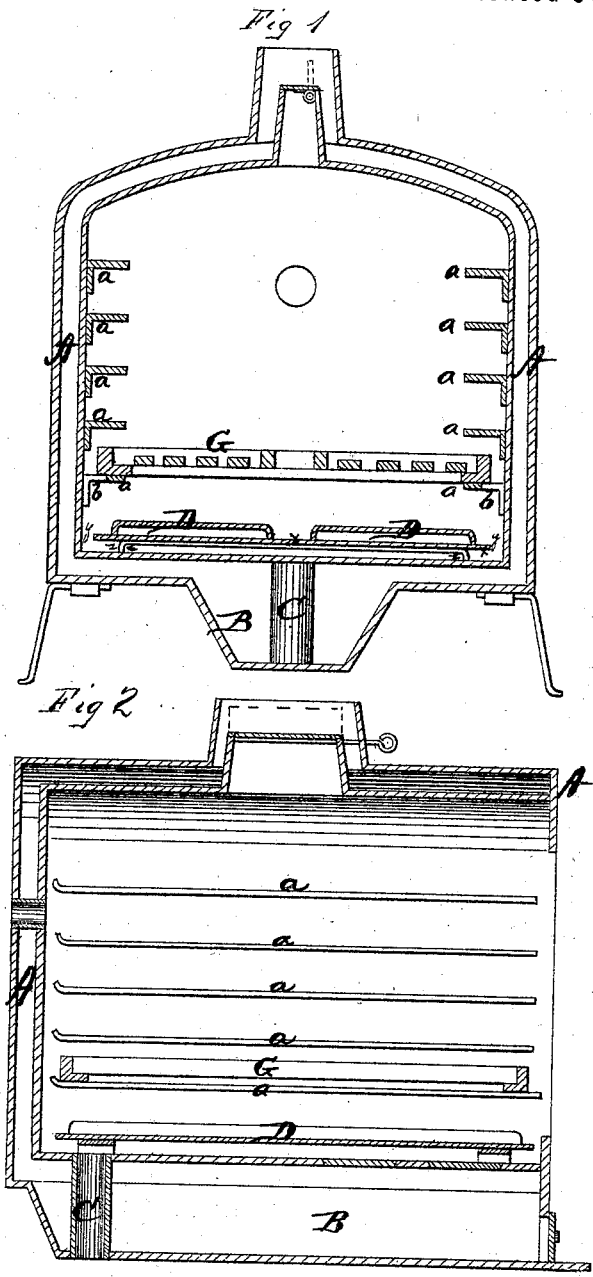
Witnesses:
Henry N. Miller
C. L. Evert
Inventor
S. L. Cheyney
per Alexander Mann
Attorneys.

SOLON L. CHEYNEY.
Improvement in Driers.
No. 120,242.
Patented Oct. 24, 1871.
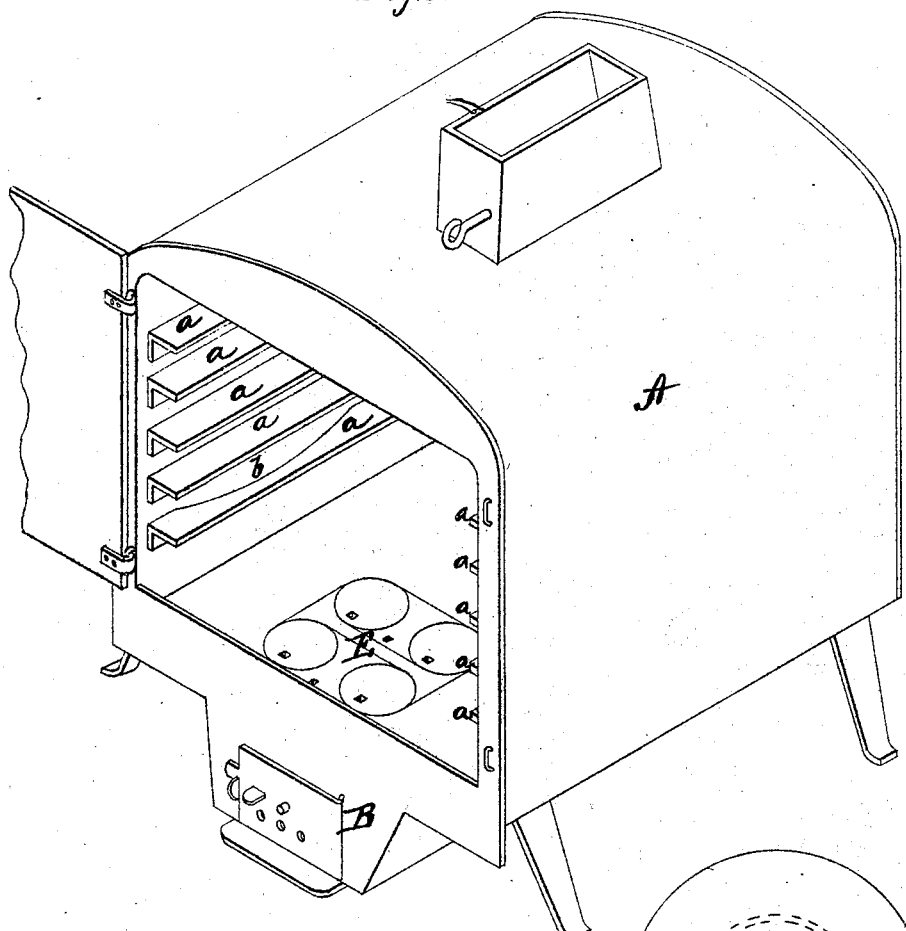
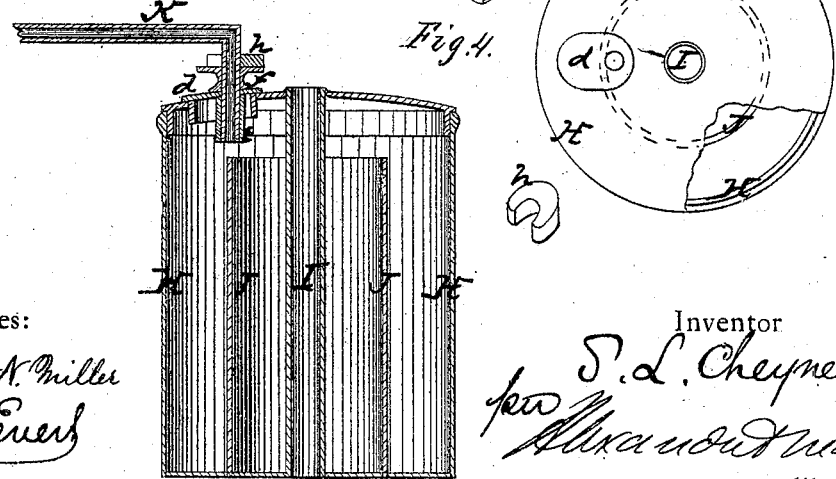

UNITED STATES PATENT OFFICE.

SOLON L. CHEYNEY, OF SPRINGFIELD, OHIO.

IMPROVEMENT IN DRIERS.

Specification forming part of Letters Patent No. 120,242, dated October 24, 1871.

*To all whom it may concern:*

Be it known that I, SOLON L. CHEYNEY, of Springfield, in the county of Clark and in the State of Ohio, have invented certain new and useful Improvements in Combined Drier, Baking-Oven, and Agricultural Steamer; and do hereby declare that the following is a full, clear, and exact description of the same, reference being had to the accompanying drawing and to the letters of reference marked thereon making a part of this specification.

The nature of my invention consists in certain improvements upon the fruit-drier for which Letters Patent were granted to me April 28, 1868; and consists in the removability of the non-conductors, its adaptability to cooking and steaming, and in the construction of parts, all as will be hereinafter more fully set forth.

In order to enable others skilled in the art to which my invention appertains to make and use the same, I will now proceed to describe its construction and operation, referring to the annexed drawing, in which—

Figure 1 is a transverse vertical section, and Fig. 2 a longitudinal vertical section of my fruit-drier. Fig. 3 is a perspective view of the same, showing its adaptation as a cooking-stove and baking-oven. Fig. 4 shows the boiler used in my fruit-drier to make it an agricultural steamer for cooking food for stock.

A represents the body of my fruit-drier, composed, as described in my patent above referred to, of an outer and an inner shell, with furnace B underneath and one or more cold-air pipes, C. D D represent the non-conductors, constructed in the same manner as in my former case, except that they are not stationary, but movable, so that they can be removed and put in at pleasure. This I consider of very great importance in view of another improvement made in the bottom of the drier. It will be seen that the two conductors D D are secured to a metallic plate, $x$, which is provided with feet $z$, and when placed in the drier rests a short distance above the bottom plate of the oven, leaving a narrow air-passage, $y$, at each side and the front end. This latter improvement consists in providing the bottom of the drier, directly above the furnace, with a cook-stove top, E, having the usual stove-holes and lids, so that the drier may at any time be used for outdoor cooking. $a\ a$ represent strips of angular iron attached to the inside of the drier for the purpose of placing the trays or shelves G G upon. The lower strips $a\ a$ are provided with openings $b\ b$, so as to permit the heated air that arises between the non-conductors and sides of oven to pass the lower shelves and be thrown onto the center ones. H represents a steam-boiler, to be placed inside the drier to form an agricultural steamer to cook food for stock. Through this cylinder is a central flue, I, surrounded by an interior cylinder, J, extending from the bottom of the boiler to within a short distance of the top of the boiler, thereby exposing the water to a greater heating surface in a vertical steam-boiler. If more than one flue, I, is formed in the boiler H each flue should have a cylinder around it in the same manner. Water is supplied to the space between the flue and cylinder, and the steam-dome is formed between the cylinder and rim of boiler, extending from the water-line a few inches from the bottom to the top of the boiler. $d$ represents the man-head of the steam-boiler, through which man-head the steam-escape pipe K passes. This pipe passes through a tube, $e$, formed on the inner or under side of the man-head; and upon the pipe is formed a valve, $f$. Thus the escape-pipe, in addition to its ordinary use, also answers that of a safety-valve, and is kept to its place by weights $h$.

Thus it will be seen that my drier may be used as a cooking-stove, baking-oven, and agricultural steamer.

When drying and baking, the non-conductors are put in on the bottom of the drier A; but when used as a steamer or stove they must be removed.

Having thus fully described my invention, what I claim, and desire to secure by Letters Patent, is—

1. The removable non-conductors D D, secured to the plate $x$ provided with feet $z$, and used in the dry-house, constructed substantially as and for the purposes herein set forth.

2. The combination in the dry-house and oven, constructed substantially as described, of angular strips $a\ a$, the lower set of which is provided with apertures *b b*, substantially as and for the purposes herein set forth.

3. The combination of the drier A, having its floor provided with the removable cooking-stove top E and boiler, all constructed and arranged to operate substantially as and for the purposes set forth.

In testimony that I claim the foregoing I have hereunto set my hand this 19th day of August, 1871.

S. L. CHEYNEY.

Witnesses:
  THOMAS J. DAVIS,
  T. M. EASBY. (48)